March 17, 1931.　　　M. PATTI　　　1,797,100
BODY MOUNTING
Filed April 13, 1929
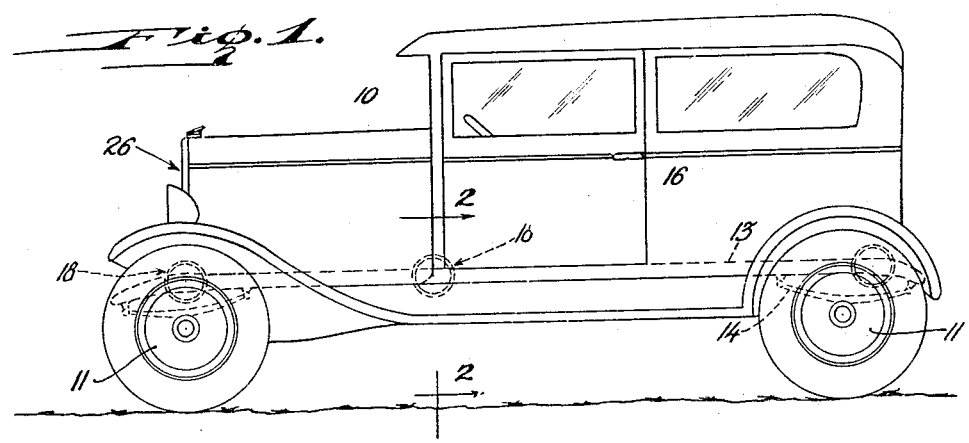
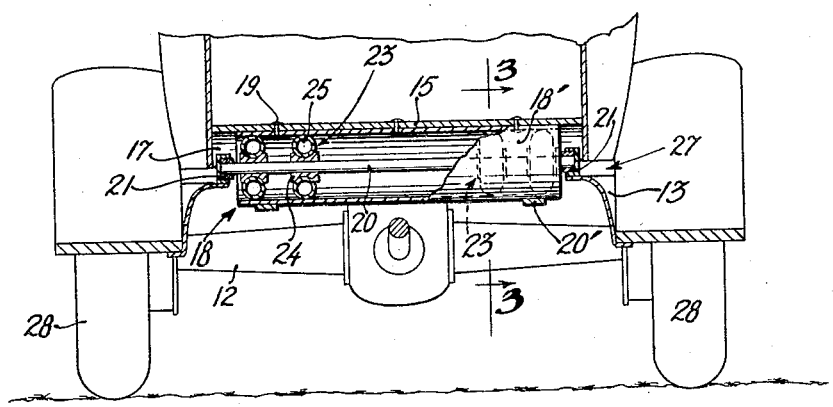
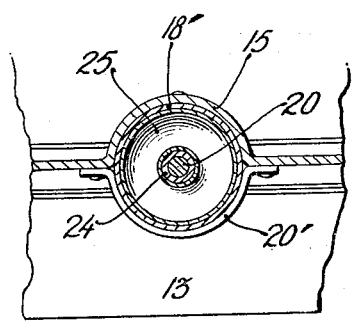
MARIO PATTI, INVENTOR.
BY Victor J. Evans, ATTORNEY.
WITNESS Patented Mar. 17, 1931

1,797,100

UNITED STATES PATENT OFFICE

MARIO PATTI, OF BROOKLYN, NEW YORK

BODY MOUNTING

Application filed April 13, 1929. Serial No. 354,924.

This invention relates to improvements in shock-absorbers for motor vehicles for mounting between the chassis frame of the vehicle and the body thereof.

The primary object of the invention is the provision of auxiliary cushioning means for cooperating with the usual laminated steel springs of vehicles to reduce the shock of the vibration of vehicle bodies, responding to the bumping of the wheels during travel, thereby adding to the comfort of persons riding in the vehicles.

Another object of the invention is to provide pneumatic rings for yieldably supporting the body of a vehicle above the frame thereof which is carried above the usual traction and free wheels, while the tires of the latter maintain contact with the ground.

A further object of the invention is to provide a housing for accommodating therein, between the chassis and body of a vehicle, pneumatic tires for supporting the body and reducing the vibration of the same during travel, while the usual wheels of the running gear may be equipped with solid tires of increased strength.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a side elevational view of an automobile having my improved shock absorber installed therein.

Figure 2 is a vertical transverse sectional view on the line 2—2 of Figure 1.

Figure 3 is a vertical sectional detail view on the line 3—3 of Figure 2.

Referring particularly to the drawings by reference characters, the numeral 10 designates a complete automobile, the running gear of which includes a set of wheels 11 and axle housings 12, above which a chassis frame 13 is supported on the usual springs 14.

In the preferred form of the invention the floor 15 of the body 16 is provided with three transverse recesses 17, semicircular in cross section, in each of which a body supporting unit 18 comprising a hollow cylinder or housing 18' is attached fixedly as at 19, there being also supporting straps 20' for securing said housing thereto. Each of these units, the construction of which is identical, includes a shaft 20, extending axially through the housing, and which has its ends seated in bearings 21 mounted in the side rails of the chassis frame 13.

On each shaft 20, adjacent its respective ends, are cushioning members 23 each of which comprises a hub or collar 24, fixed to said shaft and having a peripheral groove or semicircular shaped recess therein to accommodate a tubular ring 25 of rubber or the like, which may or may not be provided with an air control valve. As, however, these rings are inflated when inserted in the housing, in which there is ordinarily nothing to mutilate or puncture the rings, the latter remain effectively inflated for an indefinite period of time. The shaft 20 may have any number of cushioning members 23 if desired.

Although I have provided three shock absorbing units 18, one at each end of the body and another intermediate the ends, any other number of these supports may be installed in a vehicle, depending upon the type and wheel base of the same. It will be noted that, while the chassis frame carrying the shaft 20 is spaced from the body 16, thereby allowing for movement of said body, the weight of the latter, relative to the chassis frame, is primarily supported on the pneumatic tires 25.

By reason of this construction improved results are obtained with solid rubber tires 28 on the wheels 11, a material reduction of expense being effected, since these tires 28 do not become punctured and give a much longer period of efficient service in contact with the ground than inflated tires. On certain occasions, as when using my pneumatic body supporting rings 25 with existing automobiles, pneumatic tires may also be used on the wheels 11, instead of the solid tires 28.

While I have described what I deem to be the most desirable embodiment of my invention, it is obvious that many of the details may be varied without in any way departing from the spirit of my invention, and I therefore do not limit myself to the exact deails of construction herein set forth nor to anything less than the whole of my invention limited only by the appended claims.

What is claimed as new is:—

1. The combination with an automobile comprising a body and a chassis frame, of supporting means for said body including a longitudinally disposed frame attached to said chassis frame, transverse hollow cylinders attached to said body, shafts passing through said cylinders and terminally mounted in said longitudinally disposed frame, hubs fixed to said shaft within said cylinders, and pneumatic tires mounted on said hubs and contacting with the interior of said cylinders thereby yieldably supporting the weight of said body, which latter is spaced from said chassis frame.

2. In a vehicle having running wheels and a frame carried thereon, a body having transverse recesses therein; a hollow cylinder housing fixed in each recess, straps extending beneath the housings and fixed to said body supporting shafts passing through said housings and terminally mounted on said frame, and body supporting members carried by said shaft and contacting with the interior of said housings, said body being spaced from said frame.

In testimony whereof I hereby affix my signature.

MARIO PATTI.